(12) United States Patent
Vedula et al.

(10) Patent No.: US 11,650,184 B2
(45) Date of Patent: May 16, 2023

(54) SYSTEM AND METHOD FOR MONITORING ROTATING EQUIPMENT

(71) Applicant: NANOPRECISE SCI CORP, Edmonton (CA)

(72) Inventors: Sunil Sharma Vedula, Edmonton (CA); Zhengwei Li, Edmonton (CA)

(73) Assignee: NANOPRECISE SCI CORP, Edmonton (CA)

( * ) Notice: Subject to any disclaimer, the term of this patent is extended or adjusted under 35 U.S.C. 154(b) by 105 days.

(21) Appl. No.: 17/183,853

(22) Filed: Feb. 24, 2021

(65) Prior Publication Data

US 2022/0120717 A1 Apr. 21, 2022

Related U.S. Application Data

(60) Provisional application No. 63/093,301, filed on Oct. 19, 2020.

(51) Int. Cl.
*G01N 29/14* (2006.01)
*G01P 3/42* (2006.01)
*G01J 5/00* (2022.01)

(52) U.S. Cl.
CPC ............ *G01N 29/14* (2013.01); *G01J 5/0022* (2013.01); *G01P 3/42* (2013.01); *G01N 2291/0289* (2013.01)

(58) Field of Classification Search
None
See application file for complete search history.

(56) References Cited

U.S. PATENT DOCUMENTS

| | | | | |
|---|---|---|---|---|
| 6,199,018 B1* | 3/2001 | Quist | .................. | G01M 13/028 706/912 |
| 9,080,926 B2* | 7/2015 | Murray | ................. | F16C 41/008 |
| 2011/0248846 A1* | 10/2011 | Belov | ................ | G01N 33/0075 340/539.1 |
| 2017/0244574 A1* | 8/2017 | Moon | ..................... | H04L 41/22 |

FOREIGN PATENT DOCUMENTS

EP 3460424 A1 * 3/2019

* cited by examiner

*Primary Examiner* — Matthew G Marini
(74) *Attorney, Agent, or Firm* — Chip Law Group

(57) ABSTRACT

A system for monitoring rotating equipment. The system includes a sensor device that acquires vibration data, acoustic emission data, temperature data, and magnetic flux data of the rotating equipment. The sensor device includes base, holding frame, first integrated circuit, housing, and power source. The first integrated circuit includes a plurality of sensors and a microcontroller configured to receive vibration data, acoustic emission data, temperature data, magnetic flux data from plurality of sensors and determine anomalies of the rotating equipment. The system further comprises an application server that receives vibration data and magnetic flux data, determines revolutions per minute (RPM) data for rotating equipment, and diagnose faults based on processed vibration data and RPM data. The application server further generates a set of features and corresponding feature values and analyzes them to diagnose faults, and predict remaining useful life of the rotating equipment.

16 Claims, 12 Drawing Sheets

SYSTEM AND METHOD FOR MONITORING ROTATING EQUIPMENT

CROSS-RELATED APPLICATION

This application claims priority to U.S. Prov. App. No. 63/093,301, entitled "Automated predictive and prescriptive maintenance with a self-charging sensor", filed Oct. 19, 2020, the contents of which are hereby incorporated by reference herein in its entirety.

FIELD

Various embodiments of the disclosure relate generally to predictive maintenance. More specifically, various embodiments of the disclosure relate to methods and systems for monitoring rotating equipment to diagnose one or more faults and predict remaining useful life of the rotating equipment.

BACKGROUND

Technological advancement has led to significant development in the industrial field. Such development has enabled deployment of various machines, particularly rotatory machines such as compressors, pumps, motors, generators, rotors, fans, blowers, turbines, and the like, in different environments including oil and gas, transport, food and beverage, healthcare, and the like. The rotatory machines may tend to undergo various faults such as shaft damage, gear fault, rolling contact fault, journal fault, flexible coupling faults, and the like. Such faults may lead to the breakdown of the machines, which further may lead to disruption in production or transport. Unplanned breakdown of the machines due to maintenance issues may be expensive. Physical inspection of the machines for potential defects may also be expensive and time consuming. Therefore, it becomes essential to monitor the health of the rotatory machines to detect such faults in advance and ensure seamless production and transport without a need for physical inspection.

A known approach for monitoring the rotatory machines is condition-based maintenance. The condition-based maintenance allows monitoring of parameters including vibration, temperature, and the like of the rotatory machines to determine the condition of the rotatory machines while in operation. The condition-based maintenance relies only on real-time sensor measurements. Once a parameter reaches an unacceptable level, maintenance workers are immediately dispatched.

Another known approach for monitoring the rotatory machines is predictive maintenance. The predictive maintenance for the rotatory machine requires one or more sensors capable of observing health and performance of the rotatory machine. The predictive maintenance relies on machine learning models in addition to sensor measurements of parameters such as temperature and vibration frequency. The predictive maintenance allows prediction of future maintenance events based on the analysis of these parameters. Existing systems use wireless sensors that record data and communicate the recorded data to a remote server, for example a cloud server. Typically, such wireless sensors are powered by external batteries that need to be replaced at regular intervals for ensuring uninterrupted monitoring of the rotatory machines. Furthermore, sensor data collected by temperature and vibration sensors is not sufficient for determining a probability of occurrence of one or more faults. Such sensor data is not enough for early detection of the faults leading to further risks of facing the sudden failure of the rotatory machines. In order to monitor multiple parameters of the rotatory machine, a plurality of sensor nodes including the vibration sensor node, a temperature sensor node, and the like have to be deployed on the rotatory machine. The plurality of sensor nodes also require regular monitoring of their respective positioning and functioning. Also, each sensor node of the plurality of sensor nodes may interfere with the working of other sensor nodes due to the presence of electronic components therein. Hence, monitoring the rotatory machines by way of the plurality of sensor nodes may not be an optimal approach.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Methods for monitoring rotating equipment are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
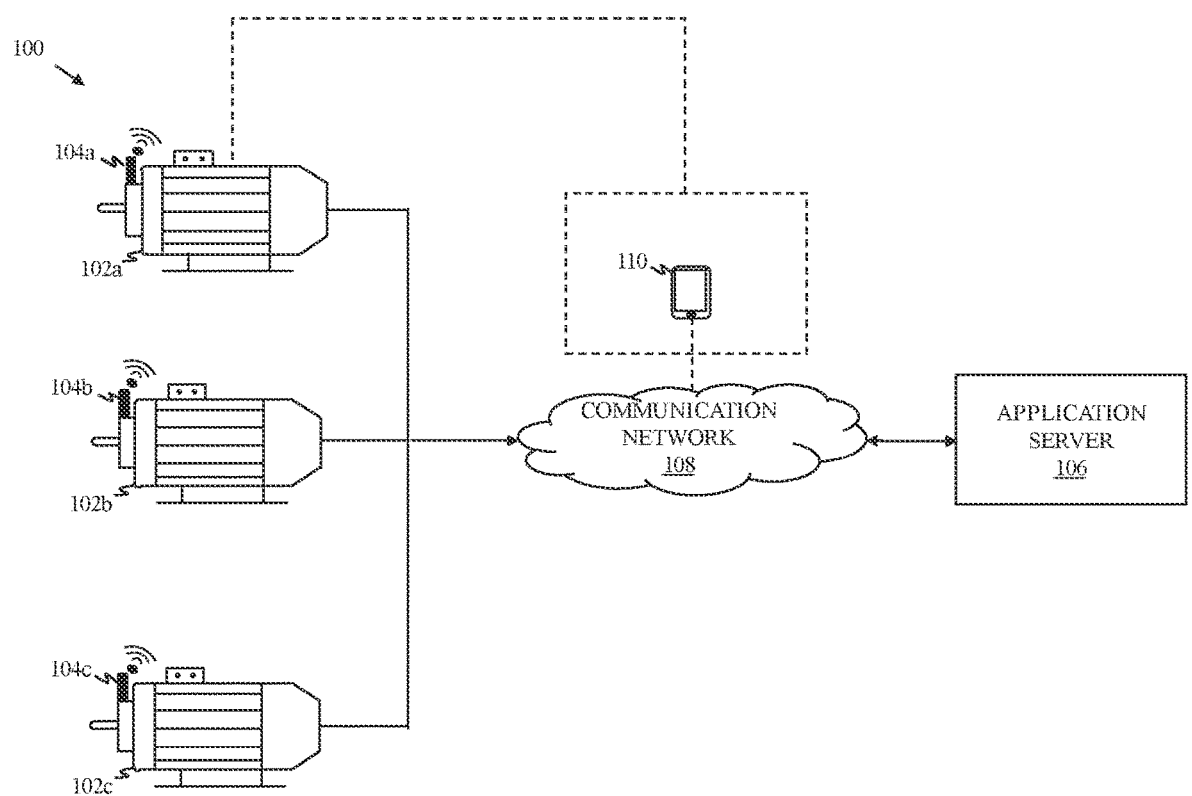
FIG. 1 is a block diagram that illustrates a system environment for monitoring a rotating equipment, in accordance with an exemplary embodiment of the disclosure.

Certain embodiments of the disclosure may be found in disclosed systems and methods for monitoring rotating equipment. Exemplary aspects of the disclosure provide a system for monitoring rotating equipment. The system performs various operations that are executed by a server (for example, a cloud server) to determine one or more faults and a remaining useful life associated with rotating equipment (for example, a motor, a compressor, or the like).

The system further includes a sensor device. The sensor device is configured to acquire vibration data, acoustic emission data, temperature data, and magnetic flux data associated with the rotating equipment. The sensor device includes a base, a holding frame attached to the base, a first integrated circuit, a power source, and a housing. The first integrated circuit, attached to the holding frame, includes a plurality of sensors and a microcontroller connected to the plurality of sensors. The plurality of sensors includes an acoustic sensor configured to collect the acoustic emission data associated with the rotating equipment, a vibration sensor configured to collect the vibration data associated with the rotating equipment, a temperature sensor configured to collect the temperature data associated with a surface of the rotating equipment, and a magnetic flux sensor configured to collect the magnetic flux data associated with the rotating equipment. The microcontroller is configured to receive the vibration data, the acoustic emission data, the temperature data, and the magnetic flux data from the plurality of sensors. The microcontroller is further configured to determine an anomaly associated with the rotating equipment based on the acoustic emission data and the temperature data. The power source includes an energy harvester and a battery. The power source is attached to the holding frame, and the power source is connected to the first integrated circuit to power the plurality of sensors and the microcontroller. The energy harvester is configured to recharge the battery. The housing is attached to the base to enclose the holding frame, the first integrated circuit, and the power source.

The application server, in communication with the sensor device via a communication network, may be configured to receive, from the sensor device over the communication network, the vibration data, and the magnetic flux data. The application server may be further configured to determine revolutions per minute (RPM) data associated with the rotating equipment based on the magnetic flux data. The application server may be further configured to diagnose one or more faults of the rotating equipment based on the received vibration data and determined RPM data. The application server may be further configured to generate a set of features and corresponding feature values from the vibration data. The application server may be further configured to analyse the set of features and corresponding feature values based on a neural network. The application server may be further configured to predict the remaining useful life of the rotating equipment using the neural network.

In another embodiment, the sensor device further comprises a second integrated circuit, including a SIM card-holder to receive a SIM card, connected to the first integrated circuit.

In another embodiment, the application server is further configured to communicate a notification to a user device associated with the rotating equipment. The notification includes one of a visual indication of the one or more faults, an audio indication of the one or more faults, and textual information regarding the one or more faults.

In another embodiment, the plurality of sensors further include a humidity sensor configured to measure humidity in vicinity of the rotating equipment.

In another embodiment, the energy harvester is further coupled to a pair of charging channels associated with the vibration sensor. The pair of charging channels is configured to provide an input to the energy harvester to harvest electric energy required to recharge the battery.

In another embodiment, the energy harvester recharges the battery based on a resonance frequency caused by vibrations detected by the vibration sensor.

In another embodiment, the base includes an opening to the surface of the rotating equipment. In another embodiment, the temperature sensor is an infra-red temperature sensor. The infra-red temperature sensor is positioned with respect to the opening in a way that the infra-red temperature sensor measures a temperature of the surface of the rotating equipment via the opening.

The methods and systems of the disclosure provide an uninterrupted and seamless monitoring of rotating equipment to diagnose one or more faults associated therewith and determine a remaining useful life of the rotating equipment. The disclosed system allows monitoring of one or more parameters (such as acoustic emission, vibrations, temperature, and magnetic flux) that are indicative of one or more faults associated with the rotating equipment. Further, the disclosed system allows monitoring of such parameters using a single sensor device configured to detect the aforementioned parameters associated with the rotating equipment. Therefore, the disclosed methods and systems allows diagnosis of one or more faults and the remaining useful life of the rotating equipment in a precise manner so that accidents and loss due to such faults could be avoided.

FIG. 1 is a block diagram that illustrates a system environment for monitoring a rotating equipment, in accordance with an exemplary embodiment of the disclosure. Referring to FIG. 1, the system environment 100 includes a plurality of rotating equipment including a first, a second, and a third rotating equipment 102a, 102b, and 102c, respectively, a plurality of sensor devices associated with corresponding rotating equipment depicted as first, second, and third sensor devices 104a, 104b, and 104c associated with respective first, second, and third rotating equipment 102a, 102b, and 102c, an application server 106, and a communication network 108. The system environment 100 further includes one or more user devices corresponding to each rotating equipment 102a, 102b, and 102c. The one or more user devices may be communicably coupled to the corresponding first, second, and third sensor devices 104a, 104b, and 104c and the application server 106 via the communication network 108. For sake of brevity the system environment 100 is shown to include a user device 110 corresponding to the first rotating equipment 102a and communicably coupled to the first sensor device 104a and the application server 106. However, in other embodiments, the system environment 100 may include additional or different user devices associated with one or more rotating equipment that may or may not include the first, second, and third rotating equipment 102a, 102b, and 102c.

The first, second, and third rotating equipment 102a, 102b, and 102c may refer to one or more mechanical or electromechanical machinery having at least one rotating component that is required for its functioning. Each of the first, second, and third rotating equipment 102a, 102b, and 102c may be standalone equipment or a combination of a plurality of equipment. The first, second, and third rotating equipment 102a, 102b, and 102c may have applications in industrial environments such as oil and gas refinery industry, utility manufacturing industry, electric device manufacturing industry, and the like and transport environments. Examples of the first, second, and third rotating equipment 102a, 102b, and 102c may include a motor, a pump, a compressor, a gearbox, and the like. Any damage or malfunctioning of the first, second, and third rotating equipment 102a, 102b, and 102c may lead to breakdown of production or transport in respective industry. The malfunctioning may be caused due to one or more faults in the first, second, and third rotating equipment 102a, 102b, and 102c. Examples of the faults may include Ball Pass Frequency Outer fault, Ball Pass Frequency Inner fault, Ball Spin Frequency fault, rotor shaft malfunctioning, gear tooth damage, and the like. Therefore, monitoring of the first, second, and third rotating equipment 102a, 102b, and 102c in order to diagnose the one or more faults becomes essential. Such diagnosis of the one or more faults significantly reduces a probability of unexpected accidents and interruption in working of the first, second, and third rotating equipment 102a, 102b, and 102c.

The first, second, and third sensor devices 104a, 104b, and 104c are mounted on the first, second, and third rotating equipment 102a, 102b, and 102c, respectively to monitor functioning of the first, second, and third rotating equipment 102a, 102b, and 102c, respectively. The first, second, and third sensor devices 104a, 104b, and 104c monitor temperature, vibration, magnetic flux, and acoustic emission associated with corresponding first, second, and third rotating equipment 102a, 102b, and 102c to determine temperature data, vibration data, magnetic flux data, and acoustic emission data. The first, second, and third sensor devices 104a, 104b, and 104c determine one or more anomalies associated with the respective first, second, and third rotating equipment 102a, 102b, and 102c by analyzing at least two of the temperature data, the vibration data, the magnetic flux data, and the acoustic emission data. The one or more anomalies may be an indicative of an abnormal functioning of the corresponding first, second, and third rotating equipment 102a, 102b, and 102c. In an example, an anomaly may refer to an unexpected change in acoustic emission associated with the corresponding first, second, and third rotating equipment 102a, 102b, and 102c.

Each of the first, second, and third rotating equipment 102a, 102b, and 102c may be associated with corresponding user devices (for example, the first rotating equipment 102a is associated with the user device 110). The user device 110 is configured to receive information associated with diagnosed faults and remaining useful life of the first rotating equipment 102a. Examples of the user device 110 may include a smart phone, a laptop, a tablet, a phablet, or the like.

Each of the first, second, and third sensor devices 104a, 104b, and 104c include a base, a holding frame attached to the base, a first integrated circuit, a microcontroller, a power source including an energy harvester and a battery, a housing attached to the base to enclose the holding frame, and a second integrated circuit. Various components of the first, second, and third sensor devices 104a, 104b, and 104c are described in detail with respect to, for example, FIGS. 2A-2D and FIG. 3. The first, second, and third sensor devices 104a, 104b, and 104c are communicably coupled to a server (for example, the application server 106) via the communication network 108. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, and a combination thereof. In some embodiments, the communication network 108 may be a cellular network such as Category M1 (CAT-1M), NarrowBand-Internet of Things (NB-IoT), Long Range Wide Area Network (LoRAWAN), second generation (2G) cellular network, third generation (3G) cellular network, fourth generation (4G) cellular network, and fifth generation (5G) cellular network. Various entities (such as the first, second, and third sensor devices 104a, 104b, and 104c, the application server 106, and the user device 110) in the system environment 100 may be communicatively coupled to the communication network 108 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The application server 106 may include suitable logic, circuitry, interfaces, and/or code, executable by the circuitry, that may be configured to perform one or more operations for diagnosing the one or more faults and predicting a remaining useful life (RUL) for the first, second, and third rotating equipment 102a, 102b, and 102c. The application server 106 may be configured to receive data from the first, second, and third sensor devices 104a, 104b, and 104c and process the data to determine the one or more faults of the first, second, and third rotating equipment 102a, 102b, and 102c. The application server 106 may be further configured to predict the RUL of the first, second, and third rotating equipment 102a, 102b, and 102c. In an embodiment, the application server 106 may be a cloud server. Various components of the application server 106 are described in detail with respect to, for example, FIG. 4.

For sake of brevity, the ongoing description is described from perspective of the first rotating equipment 102a and the first sensor device 104a. In other embodiments, the system may operate in a similar manner to diagnose one or more faults and predict the RUL for other rotating equipment, for example, second and third rotating equipment 102b and 102c.

The first sensor device 104a is configured to acquire the vibration data, the acoustic emission data, the temperature data, and the magnetic flux data associated with the first rotating equipment 102a. The first integrated circuit includes a plurality of sensors including an acoustic sensor configured to collect the acoustic emission data associated with the first rotating equipment 102a, a vibration sensor configured to collect the vibration data associated with the first rotating equipment 102a, a temperature sensor configured to collect the temperature data associated with a surface of the first rotating equipment 102a, a magnetic flux sensor configured to collect the magnetic flux data associated with the first rotating equipment 102a, and a humidity sensor configured to measure humidity in vicinity of the first rotating equipment 102a.

The microcontroller is configured to receive the vibration data, the acoustic emission data, the temperature data, and the magnetic flux data from the plurality of sensors. The microcontroller is further configured to determine an anomaly associated with the first rotating equipment 102a based on the acoustic emission data and the temperature data. The microcontroller is further configured to communicate, via the communication network 108, the vibration data and the magnetic flux data based on the determined anomaly. In an embodiment, the microcontroller is configured to communicate, via the communication network 108, the vibration data, the acoustic emission data, the temperature data, and the magnetic flux data at regular intervals of time. In another embodiment, the microcontroller is configured to communicate, via the communication network 108, the vibration data, the acoustic emission data, the temperature data, and the magnetic flux data once the anomaly is determined based on the acoustic emission data and the temperature data.

The application server 106, in communication with the first sensor device 104a, is configured to receive, from the first sensor device 104a over the communication network 108, the vibration data and the magnetic flux data. In an embodiment, the application server 106, in communication with the first sensor device 104a, is configured to receive, from the first sensor device 104a over the communication network 108, the vibration data, the acoustic emission data, the temperature data, and the magnetic flux data. The application server 106 is further configured to determine revolutions per minute (RPM) data associated with the first rotating equipment 102a based on the magnetic flux data. The application server 106 is further configured to process the received vibration data and determined RPM data to diagnose one or more faults of the first rotating equipment 102a. The application server 106 is further configured to generate a set of features and corresponding feature values from the vibration data. The application server 106 is further configured to analyse the set of features and corresponding feature values based on a neural network. The application server 106 is further configured to predict the RUL of the first rotating equipment 102a using a neural network (i.e., based on the output of the neural network). The application server 106 is further configured to communicate a notification regarding the one or more faults to the user device 110 associated with the first rotating equipment 102a. The notification includes one of a visual indication of the one or more faults, an audio indication of the one or more faults, and a textual information regarding the one or more faults.

In an embodiment, the first sensor device 104a is configured to communicate a notification (visual, audio, or textual notification) regarding the determination of the anomaly to the user device 110. In another embodiment, the first sensor device 104a is configured to generate a signal indicative of the anomaly and communicate the signal to the application server 106 to notify the application server 106 regarding the determined anomaly.

Figure 2A:
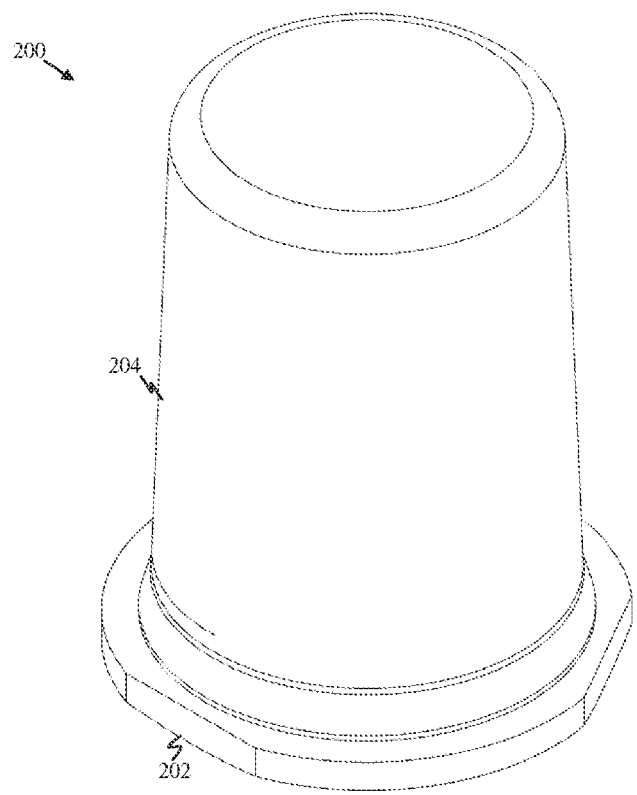
FIG. 2A is a diagram that illustrates an isometric view of a sensor device, in accordance with an exemplary embodiment of the disclosure.

FIG. 2A is a diagram illustrates an isometric view of the sensor device, in accordance with an exemplary embodiment of the disclosure. Referring to FIG. 2A, there is shown a sensor device 200 that includes a base 202 and a housing 204. In one embodiment, the base 202 may be made of a magnetic material and may be attached to the first rotating equipment 102a by way of a magnetic force of the base 202. In another embodiment, the sensor device 200 may be attached, by way of one or more screws, to a surface of the first rotating equipment 102a. In another embodiment, the sensor device 200 may be attached to first rotating equipment 102a by using an adhesive medium. The housing 204 may be attached to the base 202 and configured to encompass various components of the sensor device 200. The housing 204 and the base 202 may be attached in a way that the first integrated circuit, the second integrated circuit, the holding frame, and the power source encompassed within the housing 204 remains unaffected from external interference (such as external impact, blunt force, and the like). In an embodiment, the housing 204 may include a protrusion and the base 202 may include a slot in conformity with the protrusion such that the protrusion snuggly fits in the slot to couple the base 202 with the housing 204 to lock the base 202 and the housing 204 together. The housing 204 may further include an air vent, for example, a first opening, that allows circulation of air within the sensor device 200. Such air vent allows maintenance of temperature inside the sensor device 200. Beneficially, the air vent also allows the humidity sensor to measure the humidity in the vicinity of the first rotating equipment 102a. The sensor device 200 of FIG. 2A may be any of the first, second, and third sensor devices 104a, 104b, and 104c or any other sensor device. For sake of brevity, the sensor device 200 is considered to be the first sensor device 104a. Therefore, hereinafter "the first sensor device 104a" is referred as "the sensor device 200".

Figure 2B:
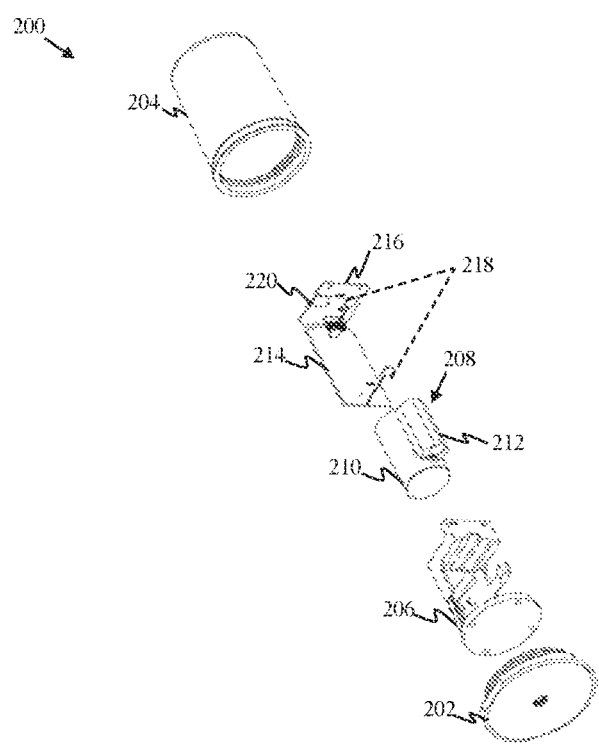
FIG. 2B is a diagram that illustrates an exploded view of the sensor device, in accordance with an exemplary embodiment of the disclosure.

FIG. 2B is a diagram that illustrates an exploded view of the sensor device, in accordance with an exemplary embodiment of the disclosure. Referring to FIG. 2B, there is shown, the sensor device 200 that includes the base 202 and the housing 204. Enclosed between the base 202 and the housing 204 are various components, such as a holding frame 206, a power source 208, a first integrated circuit 214, and a second integrated circuit 216 of the sensor device 200. The holding frame 206 is attached to the base 202. Such attachment of the holding frame 206 to the base 202 keeps the holding frame 206 fixed at a position. The power source 208 is attached to the holding frame 206 such that the holding frame 206 supports and holds the power source 208 in an intact position. The power source 208 may include an energy harvester 210 and a battery 212. The energy harvester 210 may be configured to recharge the battery 212. As shown in FIG. 2B, the sensor device 200 may further include the first integrated circuit 214 and the second integrated circuit 216 that are attached to the holding frame 206. Such attachment of the first integrated circuit 214 and the second integrated circuit 216 to the holding frame 206 keeps various components of the sensor device 200 organized in a manner that is optimal for monitoring the first rotating equipment 102a. In an example, the first integrated circuit 214 and the second integrated circuit 216 may be a printed circuit board (PCB). The power source 208 is further attached to the first integrated circuit 214 and powers the plurality of sensors and the microcontroller. The power source 208 may be further attached to the second integrated circuit 216 to power one or more components embedded on the second integrated circuit 216. The energy harvester 210 is in contact with a pair of charging channels 218 associated with the vibration sensor of the first integrated circuit 214. The pair of charging channels 218 is configured to provide the energy harvester 210 with an input to harvest electric energy required to recharge the battery 212. The input may be provided based on a resonance frequency generated due to vibrations generated by the first rotating equipment 102a. The energy harvester 210 recharges the battery 212 based on the resonance frequency caused by vibrations detected by the vibration sensor. The second integrated circuit 216 may include a smart card holder 220 that is configured to receive a subscriber identification module (SIM) card. The second integrated circuit 216 is connected to the first integrated circuit 214. The holding frame 206 may act as support structure that supports and firmly holds the power source 208, the first integrated circuit 214, and the second integrated circuit 216 within the housing 204 of the sensor device 200. The sensor device 200 of FIG. 2B may be any of the first, second, and third sensor devices 104a, 104b, and 104c or any other sensor device. For sake of brevity, the sensor device 200 is considered to be the first sensor device 104a.

Figure 2C:
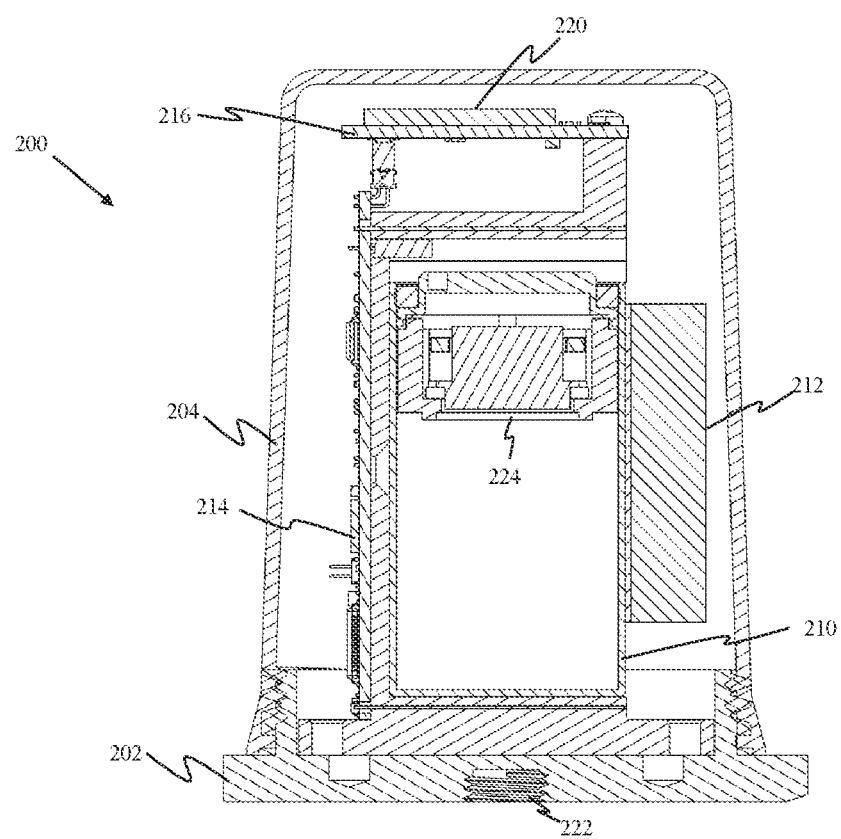
FIG. 2C is a diagram that illustrates a cross-sectional view of the sensor device, in accordance with an exemplary embodiment of the disclosure.

FIG. 2C is a diagram that illustrates a cross-sectional view of the sensor device, in accordance with an exemplary embodiment of the disclosure. Referring to FIG. 2C, there is shown, the base 202 that includes an opening 222 (i.e., a second opening) to a surface (not shown) of the first rotating equipment 102*a*. The energy harvester 210 is shown to include a charging circuitry 224 that is configured to recharge the battery 212 based on the resonance frequency caused by vibrations detected by the vibration sensor. The sensor device 200 of FIG. 2C may be any of the first, second, and third sensor devices 104*a*, 104*b*, and 104*c* or any other sensor device. For sake of brevity, the sensor device 200 is considered to be the first sensor device 104*a*.

Figure 2D:
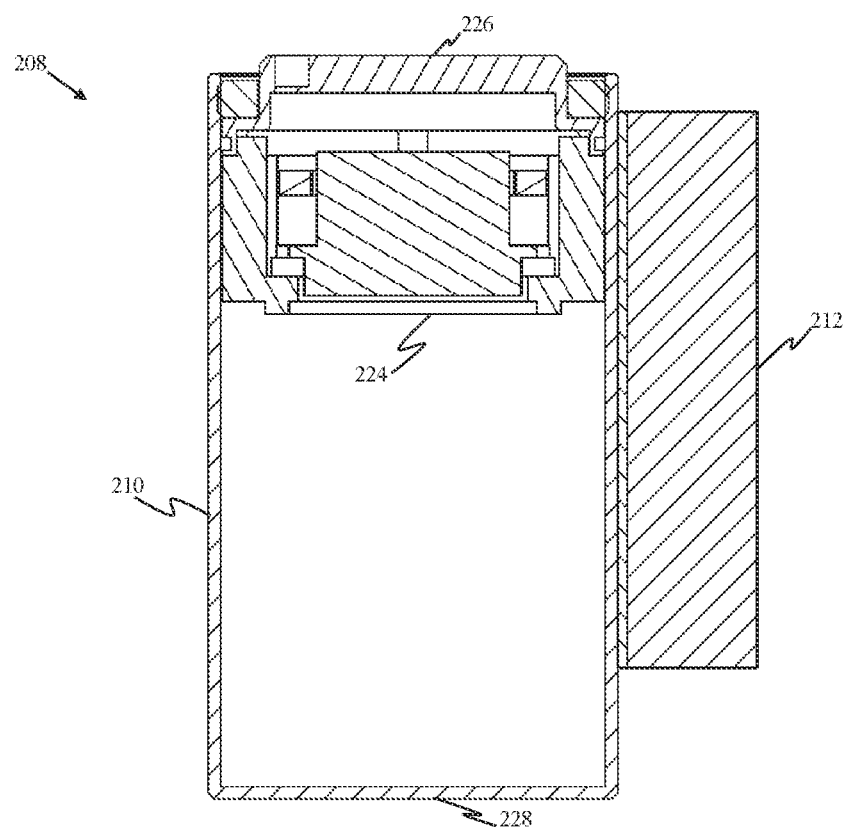
FIG. 2D is a diagram that illustrates a cross-sectional view of a power source of the sensor device, in accordance with an exemplary embodiment of the disclosure.

FIG. 2D illustrates a cross-sectional view of the power source of the sensor device, in accordance with an exemplary embodiment of the disclosure. Referring to FIG. 2D, there is shown, the power source 208 of the sensor device 200. The power source 208 includes the energy harvester 210, the battery 212, and the charging circuitry 224. In an embodiment, a top portion 226 and a bottom portion 228 of the energy harvester 210 remains in contact with the pair of charging channels 218 to receive the input for harvesting the electric charge required to recharge the battery 212. The sensor device 200 of FIG. 2D may be any of the first, second, and third sensor devices 104*a*, 104*b*, and 104*c* or any other sensor device. For sake of brevity, the sensor device 200 is considered to be the first sensor device 104*a*.

Figure 3:
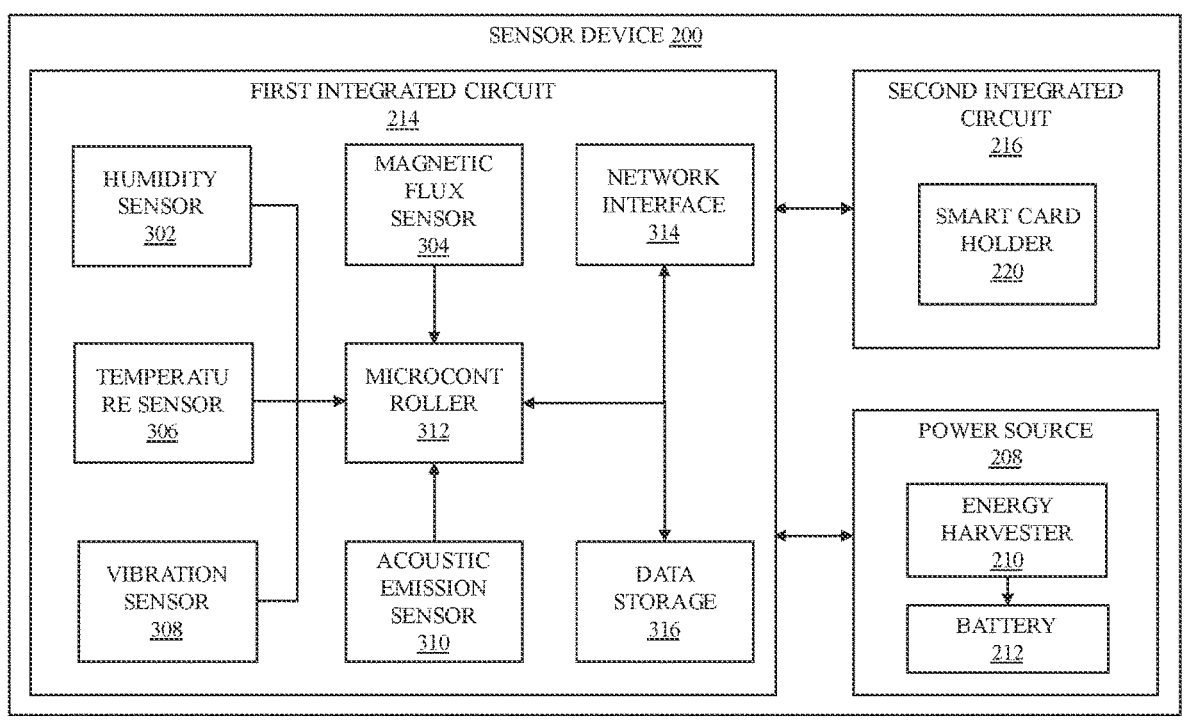
FIG. 3 is a block diagram that illustrates various components of the sensor device, in accordance with an exemplary embodiment of the disclosure.

FIG. 3 is a block diagram that illustrates various components of the sensor device, in accordance with an exemplary embodiment of the disclosure. Referring to FIG. 3, the first integrated circuit 214 includes the plurality of sensors including a humidity sensor 302, a magnetic flux sensor 304, a temperature sensor 306, a vibration sensor 308, and an acoustic emission sensor 310. The first integrated circuit 214 further includes a microcontroller 312, a network interface 314, and a data storage 316. The plurality of sensors are communicably coupled to the microcontroller 312. The microcontroller 312 is further coupled to the network interface 314 and the data storage 316. The first integrated circuit 214 is further connected to the second integrated circuit 216 and the power source 208.

The humidity sensor 302 may be configured to determine a magnitude of humidity of an environment of working of the first rotating equipment 102*a*. The humidity sensor 302 may be positioned away from the base 202 of the sensor device 200 and towards a top portion of the first integrated circuit 214. The humidity sensor 302 may be configured to detect an environmental humidity in the vicinity of the first rotating equipment 102*a*. In an embodiment, the humidity sensor may be positioned close to the air vent present at a surface of the housing 204. Beneficially, detection of the environmental humidity prevents malfunctioning of the first rotating equipment 102*a*, propagation of electric current due to presence of water, and rusting of one or more components of the first rotating equipment 102*a*. In an embodiment, the humidity sensor 302 may be positioned at an outer surface of the sensor device 200.

The magnetic flux sensor 304 may be configured to determine magnetic flux generated by the first rotating equipment 102*a*. The magnetic flux is generated due to magnetic material present in the first rotating equipment 102*a*. The magnetic flux is generated based on rotations of one or more rotating components of the first rotating equipment 102*a*. The magnetic flux sensor 304 is positioned on the first integrated circuit 214 in a way that facilitates optimal determination of the magnetic flux generated by the first rotating equipment 102*a*. In an example, the magnetic flux sensor 304 may be positioned in a way that it faces the one or more rotating components of the first rotating equipment 102*a*.

The temperature sensor 306 may be configured to determine a magnitude of temperature of the surface of the first rotating equipment 102*a*, over which the sensor device 200 is mounted. In an embodiment, the temperature sensor 306 may be an infra-red sensor. The temperature sensor 306 may be positioned in line with the opening 222 of the base 202. The temperature sensor 306, using infra-red radiations, may be configured to measure the magnitude of the temperature of the surface of the first rotating equipment 102*a*. Beneficially, the temperature sensor 306 may be configured to measure the temperature of the surface without having any actual physical contact with the surface of the first rotating equipment 102*a*. Beneficially, an abnormal magnitude of the temperature of the surface may be indicative of the one or more faults in the first rotating equipment 102*a* leading to over-heating of the first rotating equipment 102*a*.

The vibration sensor 308 may be configured to determine a magnitude of vibrations caused by the first rotating equipment 102*a*. The vibration sensor 308 may be positioned on the first integrated circuit 214 in a way that it accurately measures the vibrations caused by the first rotating equipment 102*a*. In an embodiment, the vibration sensor 308 may be positioned near the base 202 of the sensor device 200. Beneficially, an abnormal magnitude of vibration caused by the first rotating equipment 102*a* may be indicative of a fault (for example, a loose nut) in the first rotating equipment 102*a*. In an example, a looseness of a shaft of the first rotating equipment 102*a* may result in excessive vibrations being caused by the first rotating equipment 102*a*. In one example, the vibration sensor 308 may be an accelerometer.

The acoustic emission sensor 310 may be configured to determine a magnitude of acoustic emission caused by the first rotating equipment 102*a*. The acoustic emission generated by the first rotating equipment 102*a* may refer to noise (i.e., sound) caused by the first rotating equipment 102*a* when in operation. An abnormal acoustic emission caused by the first rotating equipment 102*a* may be indicative of one or more faults associated with it. In an example, a slipping bearing may lead to an excessive acoustic emission which is caused due to the fault in the first rotating equipment 102*a*.

The microcontroller 312 may include suitable logic, circuitry, interfaces, and/or code, executable by the circuitry, that may be configured to perform one or more operations for diagnosing the one or more faults of the first rotating equipment 102*a*. The microcontroller 312 is configured to receive humidity data associated with the working environment of the first rotating equipment 102*a* from the humidity sensor 302, the magnetic flux data associated with the first rotating equipment 102*a* from the magnetic flux sensor 304, the temperature data associated with the surface of the first rotating equipment 102*a* from the temperature sensor 306, the vibration data associated with the first rotating equipment 102*a* from the vibration sensor 308, and the acoustic emission data associated with the first rotating equipment 102*a* from the acoustic emission sensor 310. The acoustic emission data may be indicative of acoustic waves (i.e., sound waves) present around the first rotating equipment 102*a*.

In an embodiment, the acoustic emission data may also include noise generated due to other reasons such as movement of an equipment in the vicinity of the first rotating equipment 102*a*. Such noise may be irrelevant for functioning of the microcontroller 312. The microcontroller 312 is further configured to process the acoustic emission data to discard irrelevant acoustic waves. In one embodiment, the acoustic emission data may be filtered by using Chebyshev high pass filter. Beneficially, filtering the acoustic emission data by way of the Chebyshev high pass filter allows identification of sound waves generated by the first rotating equipment 102a when in operation. Further, the acoustic emission data is observed at different temperature points present in the temperature data. Each temperature point refers to a magnitude of temperature that is different from a chronologically preceding temperature magnitude. The microcontroller 312 is further configured to determine root mean square (RMS) values of the acoustic emission data corresponding to each temperature point. In an embodiment, at each temperature point, the microcontroller 312 is configured to determine the RMS values of the acoustic emission data corresponding to a predefined count (for example, 300 sequential acoustic emissions in recent past) of previous acoustic emissions associated with the first rotating equipment 102a. The predefined count of the acoustic emissions may refer to a defined count of sequential acoustic emissions that occurred till a time instance of corresponding temperature point. At each temperature point, the RMS value is calculated by dividing a sum of the predefined count of acoustic emissions by the predefined count. In one example, the first rotating equipment 102a be associated with "five" temperature points occurred in a chronological order. The "five" temperature points may include, for example, 50 degrees Celsius, 65 degrees Celsius, 60 degrees Celsius, 50 degrees Celsius, and 55 degrees Celsius. The predefined count may be n. Therefore, an RMS value of the acoustic emission is calculated corresponding to each temperature point. At the temperature point 50 degrees Celsius, the acoustic emissions that occurred till a time instance of the temperature point 50 degrees Celsius may be x1, x2, x3, . . . , xn. Therefore, an RMS value for the acoustic emission at the temperature point 50 degree Celsius is calculated by determining a sum of acoustic emissions (i.e., x1+x2+x3+, . . . +xn) and dividing the sum with a count of acoustic emission (i.e., (x1+x2+x3+, . . . +xn)/n). Similarly, the RMS values of the acoustic emission is determined, by the microcontroller 312, for each temperature point 65 degree Celsius, 60 degree Celsius, 50 degree Celsius, and 55 degrees.

The microcontroller 312 is further configured to observe a trend of change in the RMS values of the acoustic emissions by the first rotating equipment 102a corresponding to the temperature points associated with the first rotating equipment 102a. Based on the observed trend, the microcontroller 312 is configured to determine a threshold for the RMS values. In an instance, when the RMS value corresponding to a temperature point is greater than or equal to the threshold, the microcontroller 312 is configured to determine an anomaly associated with the first rotating equipment 102a.

In an embodiment, the microcontroller 312 may be configured to communicate, via one of the network interface 314 and the SIM card present in the smart card holder 220, the notification regarding the determined anomaly associated with the first rotating equipment 102a to the user device 110.

In an embodiment, the microcontroller 312 may be configured to communicate, via one of the network interface 314 and SIM card present in the smart card holder 220, a notification regarding an unusual ambient temperature associated with the first rotating equipment 102a to the user device 110. The microcontroller 312 may communicate the notification based on humidity data provided by the humidity sensor 302. The humidity sensor 302 may indicate that the first rotating equipment 102a is surrounded by water resulting in humidity in its vicinity.

The microcontroller 312 is further configured to communicate the vibration data and the magnetic flux data to the application server 106 (shown in FIG. 1) via the communication network 108. In an embodiment, the microcontroller 312 periodically communicates the vibration data and the magnetic flux data to the application server 106.

In an embodiment, the microcontroller 312 may be further configured to communicate the vibration data, the magnetic flux data, the humidity data, the acoustic emission data, and the temperature data to the application server 106 via the communication network 108. In another embodiment, the microcontroller 312 periodically communicates the humidity data, the acoustic emission data, the temperature data, the vibration data, and the magnetic flux data to the application server 106.

The network interface 314 may include suitable logic, circuitry, interfaces, and/or code, executable by the circuitry, that may be configured to enable the sensor device 200 to communicate with the application server 106. The network interface 314 may be implemented as a hardware, software, firmware, or a combination thereof. Examples of the network interface 314 may include a network interface card, a physical port, a network interface device, an antenna, a radio frequency transceiver, a wireless transceiver, an Ethernet port, a universal serial bus (USB) port, or the like. In one example, the network interface 314 may be enabled with Bluetooth connectivity. In another example, the network interface 314 may include a Wi-Fi module that enables a Wi-Fi based communication.

The data storage 316 may include suitable logic, circuitry, and interfaces that may be configured to store one or more instructions which when executed by the microcontroller 312 cause the microcontroller 312 to perform various operations for diagnosing the one or more faults and predicting the RUL associated with the first rotating equipment 102a. The data storage 316 may be accessible by the microcontroller 312. Examples of the data storage 316 may include, but are not limited to, a random-access memory (RAM), a read-only memory (ROM), a removable storage drive, a hard disk drive (HDD), a flash memory, a solid-state memory, or the like. It will be apparent to a person skilled in the art that the scope of the disclosure is not limited to realizing the data storage 316 in the sensor device 200, as described herein. In another embodiment, the data storage 316 may be realized in the form of a database or a cloud storage working in conjunction with the sensor device 200, without departing from the scope of the disclosure. In an embodiment, the sensor device 200 may be configured to communicate the humidity data, the acoustic emission data, the temperature data, the vibration data, and the magnetic flux data periodically or based on the determination of the anomaly.

The second integrated circuit 216 may be attached to the first integrated circuit 214. The second integrated circuit 216 may include the smart card holder 220. The smart card holder 220 may include the SIM card (i.e., a smart card) that may act as a secondary means of communication with one of the user device 110 and the application server 106. In an instance, when the network interface 314 may not be available to facilitate communication between the sensor device 200 and one of the user device 110 and the application server 106, the SIM card may be configured to facilitate communication via a mobile network associated with its service provider.

The power source 208 may be attached to the first integrated circuit 214. The energy harvester 210 of the power source 208 may be configured to receive the input from the vibration sensor 308. The input is provided based on vibrations detected by the vibration sensor 308. The energy harvester 210 is configured to harvest the electric charge based on vibrations detected by the vibration sensor 308. The energy harvester 210 is configured to harvest electric charge to recharge the battery 212 based on the resonance frequency generated due to the vibrations detected by the vibration sensor 308.

The battery 212 may be configured to receive the electric charge from the energy harvester 210 and store the electric charge to power various components of the sensor device 200, such as the plurality of sensors and the microcontroller 312.

In an embodiment, the sensor device 200 may further include an electromagnetic shield component (not shown) that prevents an electromagnetic field of a component of the first rotating equipment 102a or any other nearby electric device from interfering with an operation of components of the sensor device 200. The electromagnetic shield component may also prevent a component of the sensor device 200 from interfering in functioning of other components of the sensor device 200.

Figure 4:
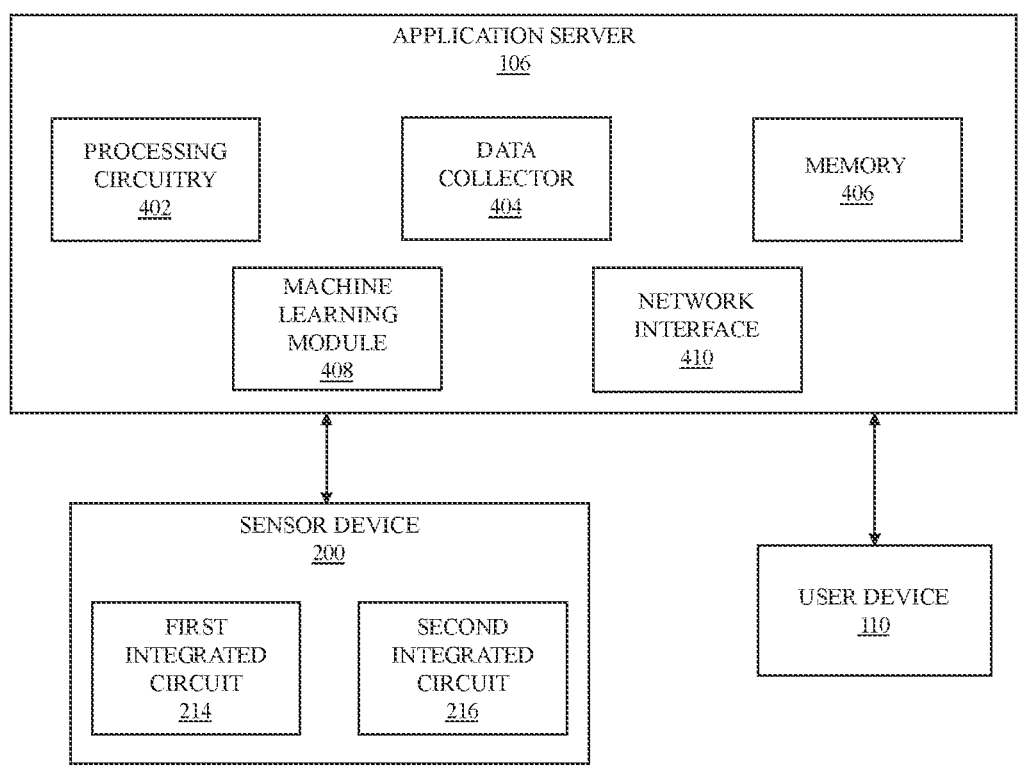
FIG. 4 is a block diagram that illustrates an application server, in accordance with an exemplary embodiment of the disclosure.

FIG. 4 is a block diagram that illustrates the application server 106, in accordance with an exemplary embodiment of the disclosure. Referring to FIG. 4, illustrated is a block diagram 400 of the application server 106. The application server 106 may include processing circuitry 402, a data collector 404, a memory 406, a machine learning module 408, and a network interface 410.

The processing circuitry 402 may include suitable logic, circuitry, interfaces, and/or code, executable by the circuitry, that may be configured to execute the instructions stored in the memory 406 to perform various operations for facilitating diagnosing one or more faults of the first rotating equipment 102a and predicting the RUL of the first rotating equipment 102a. The processing circuitry 402 may be configured to perform various operations associated with data collection and data processing. The processing circuitry 402 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 402 may be compatible with multiple operating systems. For the sake of brevity, the operations performed by the processing circuitry are described with respect to the sensor device 200.

The processing circuitry 402 receives the vibration data, the magnetic flux data, the temperature data, and the acoustic emission data from the sensor device 200. The first processor 116 may be configured to de-noise the vibration data, the magnetic flux data, the temperature data, and the acoustic emission data to reduce background noise that may degrade signal-to-noise ratio of the received the vibration data, the magnetic flux data, the temperature data, and the acoustic emission data. The processing circuitry 402 may be configured to use a suitable signal processing algorithm to de-noise the vibration data, the magnetic flux data, the temperature data, and the acoustic emission data received from the sensor device 200. In an embodiment, the signal processing algorithm may be at least one of Complete Ensemble Empirical Mode Decomposition with Adaptive Noise (CEEMDAN) algorithm and Ensemble Empirical Mode decomposition (EEMD) algorithm. Such algorithms are well known in art to pre-process signals received from the sensor device 200.

The processing circuitry 402 may be configured to process received vibration data and the RPM data to diagnose the one or more faults of the first rotating equipment 102a. The processing circuitry 402 may be configured to process the received vibration data and determined RPM data to diagnose one or more faults of the first rotating equipment 102a. The processing circuitry 402 may be configured to correlate the RPM data and the vibration data. Based on the correlation, one or more faults such as Ball Pass Frequency Outer, Ball Pass Frequency Inner, Ball Spin Frequency, shaft damage, gear fault, rolling contact fault, journal fault, flexible coupling faults, and the like are determined. The processing circuitry 402 may be further configured to use machine learning techniques to predict the RUL of the first rotating equipment 102a. For example, the processing circuitry 402 may be configured to use a Wavelet Neural Network (WNN) to predict the RUL of the first rotating equipment 102a. Examples of WNN are discussed in detail below in conjunction with FIGS. 6A and 6B. The processing circuitry 402 may be configured to transmit the faults detected and/or the RUL of the first rotating equipment 102a to the user device 110.

The data collector 204 may include suitable logic, circuitry, interfaces, and/or code, executable by the circuitry, that may be configured to collect the data from the plurality of sensors of the sensor device 200. In an embodiment, the data collector 204 may collect the data in real-time or near real-time. In another embodiment, the data collector 204 may be configured to collect the data periodically (for example, after 30 seconds, 60 seconds, 90 seconds, 120 seconds, or the like). The data collector 204 may be configured to store the collected data in the memory 406. The data collector 204 may be implemented by one or more processors, such as, but not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the data collector 204 may be compatible with multiple operating systems.

The memory 406 may include suitable logic, circuitry, and interfaces that may be configured to store one or more instructions which when executed by the processing circuitry 402 and/or the data collector 404 cause the processing circuitry 402 and/or the data collector 404 to perform various operations to facilitate diagnosing one or more faults of the first rotating equipment 102a and predicting the RUL of the first rotating equipment 102a. The memory 406 may be accessible by the processing circuitry 402 and the data collector 404. Examples of the memory 406 may include, but are not limited to, a random-access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 406 in the application server 106, as described herein.

The machine learning module 408 may include suitable logic, circuitry, and interfaces that may be configured to determine one or more rules for analyzing the data received from the sensor device 200. The machine learning module 408 may be further configured to formulate one or more criteria for diagnosing the one or more faults and determining the RUL of the first rotating equipment 102a. In an example, the machine learning module 408 may analyse the data received from the first rotating equipment during a first time-interval (for example, 30 days, 60 days, 90 days, and so on). Based on the analysis the machine learning module 408 may determine that the first rotating equipment 102a tends to generate an increased amount of acoustic emission when it is performing a particular operation. Based on the analysis, the machine learning module 408 may determine that an increase acoustic emission of the first rotating equipment 102a while performing the particular operation may not be indicative of the one or more faults.

The network interface 410 may include suitable logic, circuitry, interfaces, and/or code, executable by the circuitry, that may be configured to enable the application server 106 to communicate with the sensor device 200. The network interface 410 may be implemented as a hardware, software, firmware, or a combination thereof. Examples of the network interface 410 may include a network interface card, a physical port, a network interface device, an antenna, a radio frequency transceiver, a wireless transceiver, an Ethernet port, a universal serial bus (USB) port, or the like.

Figure 5:
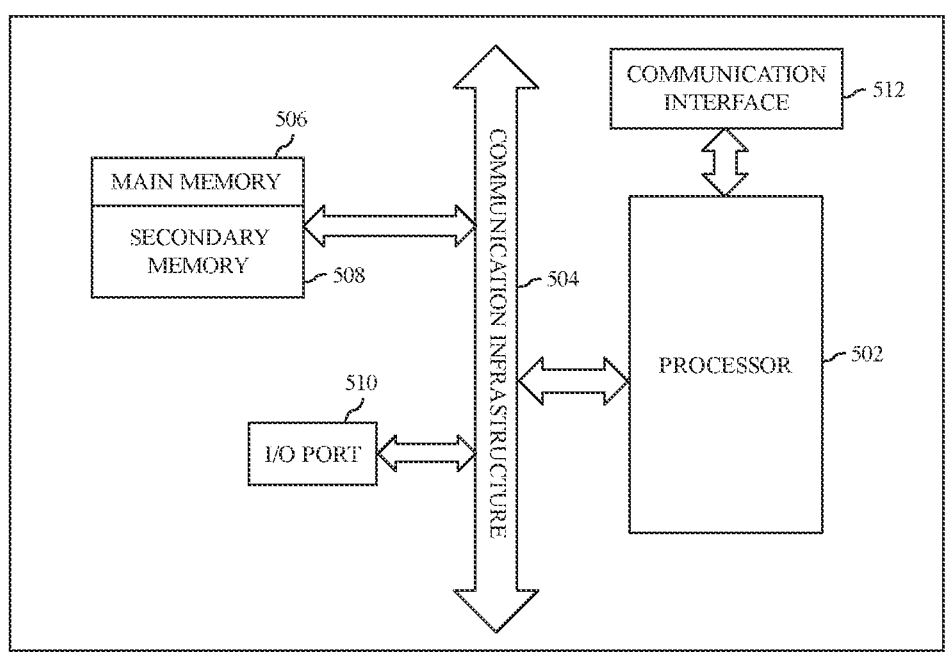
FIG. 5 is a block diagram that illustrates a system architecture of a computer system for monitoring the rotating equipment, in accordance with an exemplary embodiment of the disclosure.

FIG. 5 is a block diagram that illustrates a system architecture of a computer system for monitoring the first rotating equipment, in accordance with an exemplary embodiment of the disclosure. Referring to FIG. 5, there is shown a computer system 500 which includes a processor 502 that may be a special purpose or a general-purpose processing device. The processor 502 may be a single processor or multiple processors. The processor 502 may have one or more processor "cores." Further, the processor 502 may be coupled to a communication infrastructure 504, such as a bus, a bridge, a message queue, the communication network 108, a multi-core message-passing scheme, or the like. The computer system 500 may further include a main memory 506 and a secondary memory 508. Examples of the main memory 506 may include RAM, ROM, and the like. The secondary memory 508 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer-readable recording media.

An embodiment of the disclosure, or portions thereof, may be implemented as computer-readable code on the computer system 500. In one example, the application server 106 of FIG. 1 may be implemented in the computer system 500 using hardware, software, firmware, non-transitory computer-readable media having instructions stored thereon, or a combination thereof and may be implemented in one or more computer systems or other processing systems. Hardware, software, or any combination thereof may embody modules and components used to implement the methods of FIGS. 6A, 6B, 7A, and 7B.

The computer system 500 may further include an input/output (I/O) port 510 and a communication interface 512. The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may be signals, such as electronic, electromagnetic, optical, or other signals as will be apparent to a person skilled in the art. The signals may travel via a communications channel, such as the communication network 108, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 506 and the secondary memory 508 may refer to non-transitory computer readable mediums that may provide data that enables the computer system 500 to implement the methods illustrated in FIGS. 6A, 6B, 7A, and 7B.

Figure 6A:
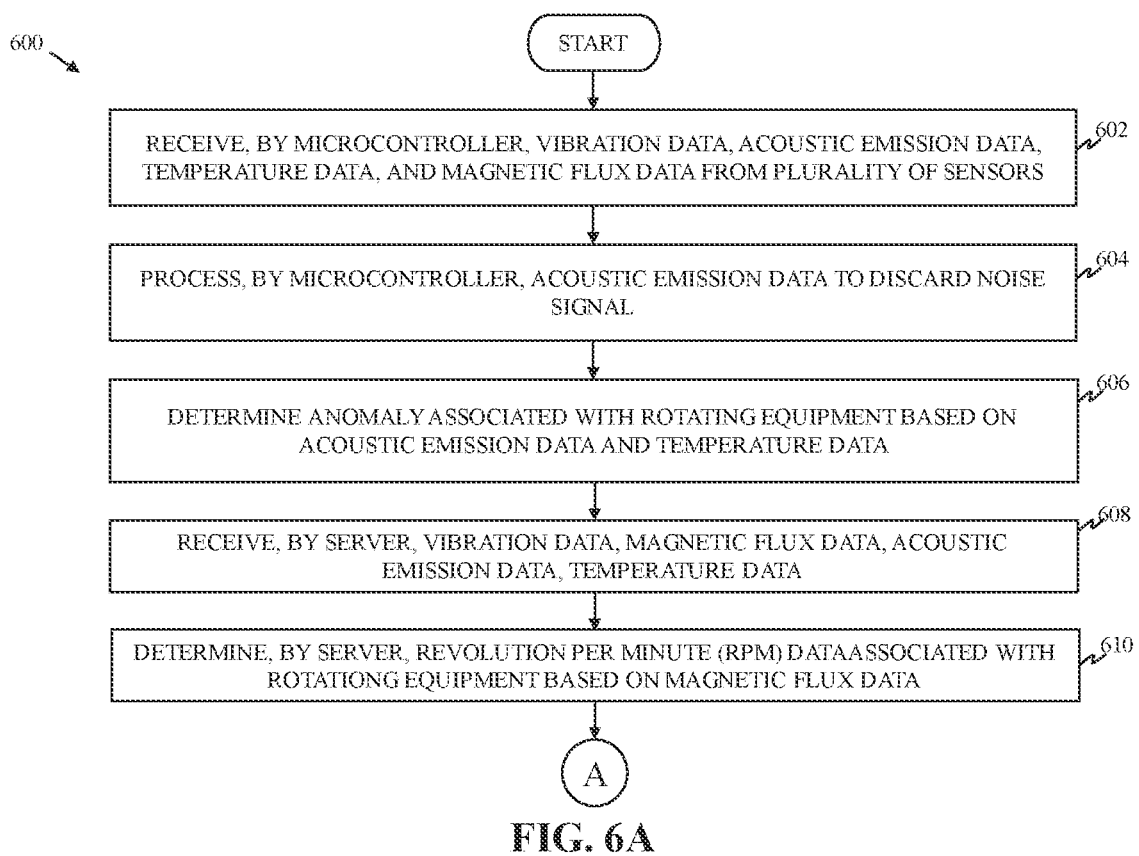
FIGS. 6A and 6B are flowcharts that collectively illustrate a method for monitoring the rotating equipment, in accordance with an exemplary embodiment of the disclosure.
Figure 6B:
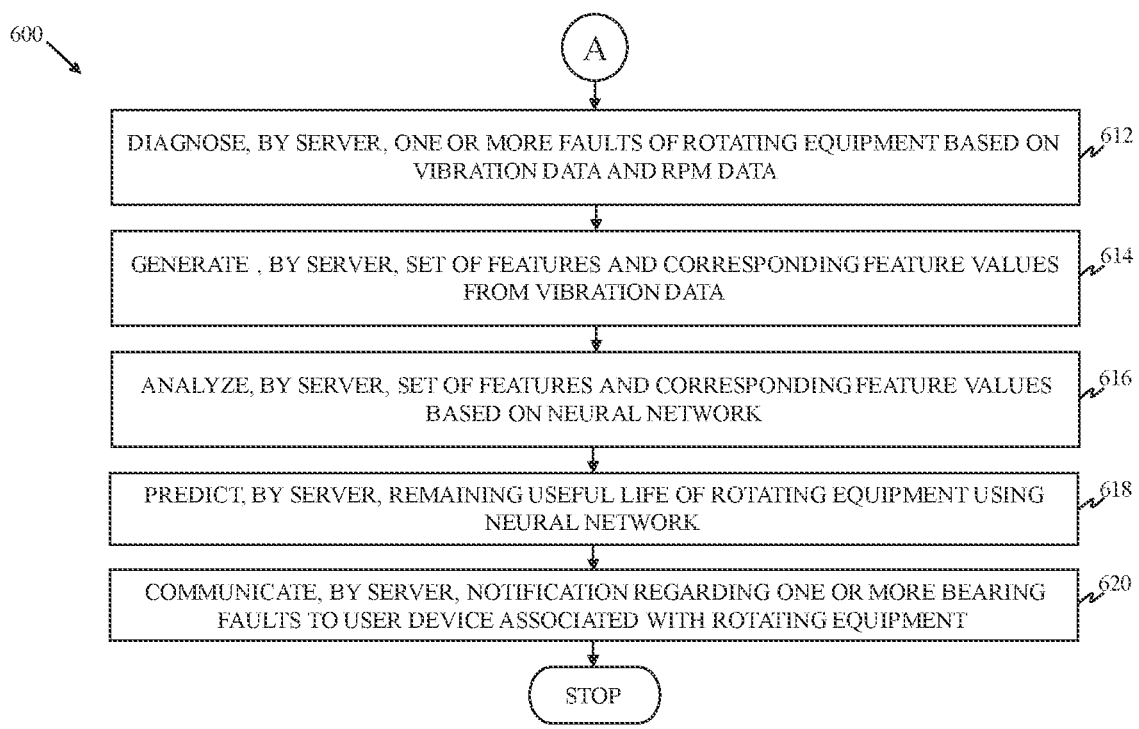

FIGS. 6A and 6B are flowcharts that collectively illustrate a method for monitoring the first rotating equipment, in accordance with an exemplary embodiment of the disclosure.

Referring to method 600, at 602, the vibration data, the acoustic emission data, the temperature data, and the magnetic flux data is received by the microcontroller 312. The microcontroller 312 may be configured to receive the vibration data, the acoustic emission data, the temperature data, and the magnetic flux data from the plurality of sensors. The plurality of sensors include the humidity sensor 302, the magnetic flux sensor 304, the temperature sensor 306, the vibration sensor 308, and the acoustic emission sensor 310. The humidity sensor 302 may be configured to detect the magnitude of humidity of the environment associated with the first rotating equipment 102a. The magnetic flux sensor 304 may be configured to detect the magnitude of magnetic flux generated due to rotations of one or more rotating components of the first rotating equipment 102a. The temperature sensor 306 may be configured to detect the magnitude of the temperature of the surface of the rotating equipment that is in contact with the sensor device 200. The vibration sensor 308 may be configured to detect the magnitude of vibrations (i.e., sound waves) caused by the first rotating equipment 102a when in operation. The acoustic emission sensor 310 may be configured to detect the magnitude of the acoustic emissions in the environment of working of the first rotating equipment 102a. The plurality of sensors may be configured to communicate the vibration data, the acoustic emission data, the temperature data, and the magnetic flux data to the microcontroller 312.

At 604, the acoustic emission data is processed to discard noise signals present therein (i.e., irrelevant data). The microcontroller 312 may be configured to process the acoustic emission data to discard the noise signal. The noise signal may be caused due to working/movement of nearby equipment, talking and shouting of one or more individuals, and the like. The microcontroller 312 may be configured to apply a signal processing technique to filter out the noise signals. In an example, the microcontroller 312 may be configured to apply Chebyshev high pass filter on the acoustic emission data to filter out the noise signals. Beneficially, discarding the noise signal enables an accurate determination of anomaly associated with the first rotating equipment 102a.

At 606, the acoustic emission data and the temperature data are pre-processed to determine the anomaly associated with the first rotating equipment 102a. The microcontroller 312 may be configured to determine the anomaly associated with the first rotating equipment 102a based on the acoustic emission data and the temperature data. The acoustic emission data and the temperature data are pre-processed by determining the RMS value of the acoustic emission corresponding to each temperature point of the temperature data. In an embodiment, for each temperature point of the first rotating equipment 102a, the microcontroller 312 may be configured to determine the RMS value of the predefined count of acoustic emissions associated with the first rotating equipment 102a. In one example, the predefined count may be "350" acoustic emissions. Based on a trend in the RMS values in correspondence with the temperature points, the microcontroller 312 may be configured to determine the threshold associated with the RMS values. The threshold may refer to an average magnitude of acoustic emission associated with the first rotating equipment 102a at or after which the first rotating equipment 102a tends to have one or more faults. The anomaly associated with the first rotating equipment 102a is determined based on a current RMS value of acoustic emission being greater than or equal to the determined threshold.

In an embodiment, the microcontroller 312 may be configured to determine RMS values of any one of the magnetic flux data, the vibration data, or the acoustic emission data corresponding to each temperature point of the first rotating equipment 102a. A threshold is determined based on a trend in the RMS values with respect to each temperature point. The anomaly is detected when the RMS value corresponding to a current temperature point exceeds or becomes equal to the threshold value.

At 608, the vibration data, the magnetic flux data, the acoustic emission data, and the temperature data are received by the application server 106. The application server 106 may be configured to receive the vibration data, the magnetic flux data, the acoustic emission data, and the temperature data. The vibration data, the magnetic flux data, the acoustic emission data, and the temperature data are communicated by the microcontroller 312 based on the determination of the anomaly.

The application server 106 may configured to pre-process the vibration data, the magnetic flux data, the acoustic emission data, and the temperature data using a signal processing algorithm to de-noise the vibration data, the magnetic flux data, the acoustic emission data, and the temperature data. The signal processing algorithm may decompose a digital signal into a plurality of intrinsic mode functions (IMFs). The digital signal having multiple oscillation modes may be decomposed into its constituent monocomponent signals i.e., oscillatory modes. Each intrinsic mode function (IMF) is associated with an oscillatory mode embedded in the digital signal. The digital signal corresponding to the vibration data determined by the vibration sensor 308 may be weak in nature since it can be affected by the background noise, especially in case of early faults. Therefore, the application server 106 may be configured to pre-process digital signals to reduce the background noise and the errors of measurement systems, to further acquire useful information and improve signal-to-noise ratio (SNR). In an embodiment, the signal processing algorithm may be at least one of Complete Ensemble Empirical Mode Decomposition with Adaptive Noise (CEEMDAN) algorithm and Ensemble Empirical Mode decomposition (EEMD) algorithm.

At 610, the RPM data associated with the first rotating equipment 102a is determined based on the magnetic flux data. The application server 106 may be configured to determine the RPM data associated with the first rotating equipment 102a based on the magnetic flux data. The application server 106 may be configured to determine a count of rotations per minute by the first rotating equipment 102a based on a count of complete cycles of magnetic flux waves in a single minute. In other words, each count of a complete cycle of the magnetic flux waves corresponds to a rotation of one or more components of the first rotating equipment 102a. Therefore, the count of complete cycles of magnetic flux waves in a minute refers to the RPM data associated with the first rotating equipment 102a.

At 612, the received vibration data and the RPM data are processed to diagnose the one or more faults of the first rotating equipment 102a. The application server 106 may be configured to process the received vibration data and determined RPM data to diagnose one or more faults of the first rotating equipment 102a. The RPM data and the vibration data are correlated. Based on the correlation, one or more faults such as Ball Pass Frequency Outer, Ball Pass Frequency Inner, Ball Spin Frequency, shaft damage, gear fault, rolling contact fault, journal fault, flexible coupling faults, and the like are determined. In an embodiment, the application server 106 may be further configured to diagnose other faults such as unbalanced shaft of the first rotating equipment 102a, misalignment of the shaft, looseness of the shaft, Rotor Bar Fault, Stator Fault, and the like.

The application server 106 may be configured to analyze the vibration data of the first rotating equipment 102a at a determined RPM (from the RPM data) to determine one or more faults. Notably, when a fault occurs, strength of the first rotating equipment 102a around the fault changes, producing an impulse or shock. Further, the impulse may result in the variation of digital signals of the vibration data. Moreover, amplitudes and distributions of the digital signals of the vibration data may also change. Therefore, the application server 106 may be configured to observe the vibration data of the first rotating equipment 102a at the determined RPM to diagnose the one or more faults.

In an embodiment, the application server 106 may be configured to determine the faults based on correlation between at least two of the magnetic flux data, the vibration data, and the acoustic emission data.

At 614, the set of features and the feature values are generated from the vibration data. The application server 106 is further configured to generate the set of features and the feature values from the vibration data. In an embodiment, the application server 106 may be configured to generate the set of features and the feature values from one of the magnetic flux data, the vibration data, and the acoustic emission data.

The application server 106 may be configured to select sensitive IMFs of the vibration data. The application server 106 may be configured to use a selection criterion that indicates the sensitive IMFs. The application server 106 may be further configured to generate/extract the set of features from the sensitive IMFs.

In an embodiment, the set of features may include one of the vibrations caused by the first rotating equipment 102a at each temperature point, vibrations caused by the first rotating equipment 102a at each time instance, vibrations caused by the first rotating equipment 102a during a predefined time-period, an amplitude of vibrations caused by the first rotating equipment 102a, a wavelength of vibrations caused by the first rotating equipment 102a, and the like. The corresponding feature values include numerical values of vibration data corresponding to the feature values.

In another embodiment, the set of features may include one or more statistical features at a given time instant associated with the first rotating equipment 102a. The statistical features may be time-domain statistical features (for example, standard deviation, kurtosis, shape factor, impulse factor, or the like), frequency-domain statistical features (for example, mean frequency, root mean square frequency, standard deviation frequency), and time-frequency domain statistical features (for example, spectrum peak ratio of bearing outer race, spectrum peak ratio of bearing inner race, spectrum peak ratio of bearing roller).

The application server 106 may be configured to extract the set of features from the sensitive IMFs of digital signals of the vibration data at first and second time instances t−1 and t. The application server 106 may be configured to extract/generate combination of time-domain and frequency-domain features from the sensitive IMFs. For example, the kurtosis (Xkur), the root mean square (Xrms), the peak factor (Xpeak), and the crest (Xcrest) are extracted statistical features from the sensitive IMFs. The combination of time-domain and frequency domain features allows the neural network to predict the remaining useful life of the first rotating equipment 102a with improved accuracy.

At 616, the set of features and the corresponding feature values are analyzed using the neural network. Examples of the neural network include, but are not limited to, wavelet neural network. The neural network may be trained based on a supervised or unsupervised learning technique. The neural network may be trained based on historical data including temperature data, vibration data, magnetic flux data, and temperature data associated with one or more rotating equipment that may or may not include the first, second, and third rotating equipment 102a, 102b, and 102c.

In an embodiment, the neural network may include three layers including an input layer, a hidden layer, and an output layer. Each layer may have one or more neurons or nodes. A wavelet basis function may possess properties of localization and be an orthogonal basis function. The input layer may be fed with the feature values of the set of features extracted from the vibration data. In the hidden layer, a wavelet basis $\psi_{a,b}(\ )$ function may be used as an activation function. The output of the neural network is provided by the following expression:

$$C = \varphi \frac{(u_k - b)}{a} \qquad (1)$$

where,
a is a dilation parameter;
b is a translation parameter; and
$u_k$ is a sum of weighted inputs.

$$u_k = \Sigma W_{ki} x_i \qquad (2)$$

where,
$W_{ki}$ is a weight; and
$x_i$ is an input.

In another embodiment, Morlet wavelet may be used as the activation function of the neurons in the hidden layer. The Morlet wavelet expression and the calculation of partial derivatives of the corresponding error function are computationally efficient. Hence, the Morlet wavelet helps in updating of parameters in the training process. In an embodiment, the wavelet basis function may be one of Haar, Mexican Hat, Shannon, and/or Meyer.

In an embodiment, the Morlet wavelet is represented by the following equation, $$\varphi(t) = \cos(5t) e^{\left(\frac{-t^2}{2}\right)} \qquad (3)$$

where,
t is time.

The application server 106 may be configured to input the set of features into the neural network to predict the RUL of the first rotating equipment 102a. The application server 106 may be configured to apply the feature values of the set of features extracted at time t as the input to the neural network. In an embodiment, the application server 106 may be configured to fit the extracted set of features with Weibull hazard rate function. The application server 106 may further be configured to input fitted measurement values of the extracted set of features into the neural network as inputs, thereby increasing the accuracy of the prediction of the RUL of the first rotating equipment 102a. The application server 106 may be configured to use fitted measurement values of the extracted set of features at the first and second time instances t−1 and t as input values to the neural network.

The application server 106 may be configured to process the set of features in the hidden layer using the Morlet Wavelet Function to produce an output at the output layer of the neural network. The output of the neural network may be normalized life percentage $T_i$. Life percentage, which is proportional to time, provides accurate mapping of the health condition of the first rotating equipment 102a. The first rotating equipment 102a may be considered to be totally damaged when the first rotating equipment 102a reaches 100% of the life percentage. The output of the neural network may be normalized between 0 and 1. Further, the output of the neural network is a predicted value of the life percentage of the first rotating equipment 102a.

In an embodiment, the application server 106 may be configured to input the set of features into the neural network to automatically diagnose one or more faults of the first rotating equipment 102a. The input layer may include the set of features extracted at time t as the input to the neural network. The application server 106 may be configured to process the set of features in the hidden layer using the Morlet Wavelet Function to produce an output at the output layer. The output of the neural network may be in the form of a normalized score (Li). In the output layer, a function is used that maps the normalized score to a specific label. The specific label corresponds to a health condition of the first rotating equipment 102a. For example, label '1' corresponds to normal condition, label '2' corresponds to slight rub fault in the outer race, label '3' corresponds to serious flaking fault in the outer race, and the like.

At 618, the remaining useful life of the first rotating equipment 102a is predicted using the neural network. The application server 106 is configured to predict the remaining useful life of the first rotating equipment 102a using the neural network. The neural network may be trained based on the historical data associated with the first rotating equipment 102a. In one embodiment, the neural network may be trained based on the historical data associated with a first set of rotating equipment that may or may not include the first, second, and third rotating equipment 102a, 102b, and 102c. The neural network, based on an amplitude of the vibration data, the set of features, and feature values, may determine the remaining useful life of the first rotating equipment 102a.

The application server 106 may be configured to run the neural network to predict the RUL of the first rotating equipment 102a. In an embodiment, a training set may be formed of historical data that includes vibration signals, faults, and equipment life collected from one or more rotating equipment that function similar to the first rotating equipment 102a. The equipment life represents time (in hours or days) until a rotating equipment fails. The vibration signals are collected at regular intervals of time from the rotating equipment.

Further, the application server 106 may be configured to calculate a mean square error (MSE) between the actual value and predicted value. The MSE can be used to present the network performance to define preferred neural network model. Once the application server 106 obtains the MSE, the application server 106 may be configured to adjust weights and biases of the neural network to minimize the MSE. The application server 106 may be configured to perform the training process at regular time intervals.

The application server 106 may be configured to construct a validation set by multiplying the fitted set of features at the first and second time instances t−1 and t with a constant value ($C_p$). Moreover, the validation set contains an actual value of the life percentage of the first rotating equipment 102a multiplied by the constant value ($C_p$). In an embodiment, the constant value ($C_p$) is 1.1 where the fitted set of features are incremented by 10%.

The application server 106 may be configured to train the neural network for predicting the life percentage of the first rotating equipment 102a. In an embodiment, the application server 106 may be configured to train the neural network using Levenberg-Marquardt (LM) algorithm based on the training set and the validation set. A person skilled in the art will appreciate that any suitable algorithm can be used to train the neural network. The over-fitting problem can be solved by the use of the validation set. During training process of the neural network, the MSE for the training set and the validation set are calculated. In the training process, both MSEs for the training set and the validation set drop early because the neural network can learn the relationship between the inputs and the outputs by modifying the trainable weights based on the training set. After a certain point, the MSE for the validation set starts to increase because the neural starts to model the noise in the training set. Thus, the training process may be stopped at this point, and the preferred neural network with optimum modeling and generalization capability is achieved. The preferred neural network can be used for the prediction of the RUL of the first rotating equipment 102a.

The application server 106 may be configured to predict life percentage of the first rotating equipment 102a at the current time t using the preferred neural network. The application server 106 may be configured to calculate the RUL of the first rotating equipment 102a based on the predicted life percentage. The remaining useful life is given by the equation:

$$\text{Remaining useful life (\%)} = (100\%) - (\text{predicted life percentage}) \quad (4)$$

Typically, a manufacturer of the first rotating equipment 102a provides details related to a rotating equipment life in product specification. The rotating equipment life is number of operating hours or number of revolutions at a given speed that the first rotating equipment 102a is capable of enduring before any signs of fatigue. The remaining useful life (in hours) of the first rotating equipment 102a may be calculated using the rotating equipment life and remaining useful life (%).

In an embodiment, an accuracy of the neural network is determined based on a real-time condition of the first rotating equipment 102a. The accuracy of the neural network is further optimized based on a difference between at least one of the diagnosed one or more faults and an actual fault associated with the first rotating equipment 102a and the predicted RUL and an actual useful life of the first rotating equipment 102a.

At 620, the notification regarding the one or more faults and the predicted RUL is communicated to the user device 110. The application server 106 is configured to communicate the notification regarding the one or more faults to the user device 110. The notification includes one of a visual indication of the one or more faults, an audio indication of the one or more faults, and a textual information regarding the one or more faults. The visual indication may relate to glowing of a light indicator, displaying of an indicative symbol via a display of the user device 110, and the like. The audio indication may relate to an alarm or audio notification played via the user device 110. The textual information regarding the one or more faults refers to information such as time, severity, and the like associated with the one or more faults being displayed via the display of the user device 110. The textual information further includes information associated with the RUL of the first rotating equipment 102a.

Figure 7A:
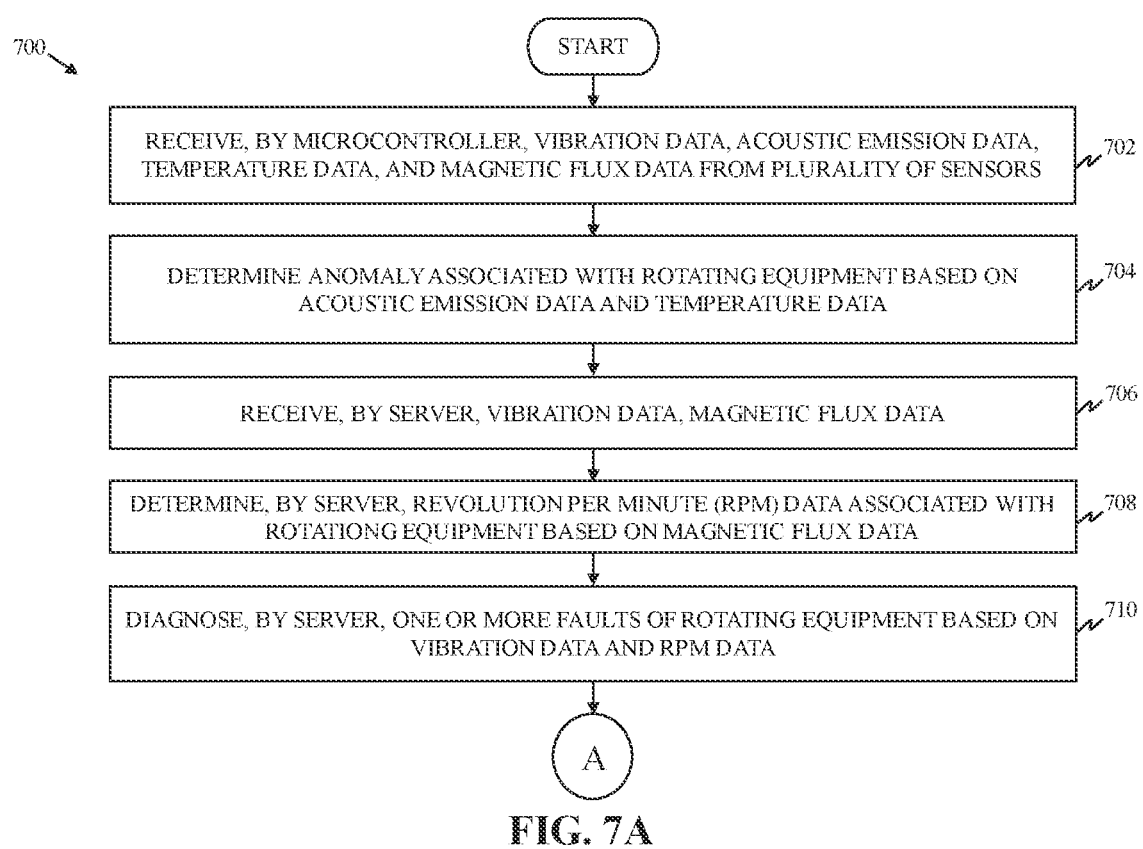
FIGS. 7A and 7B are high level flowcharts that collectively illustrate a method for monitoring the rotating equipment, in accordance with an exemplary embodiment of the disclosure.
Figure 7B:
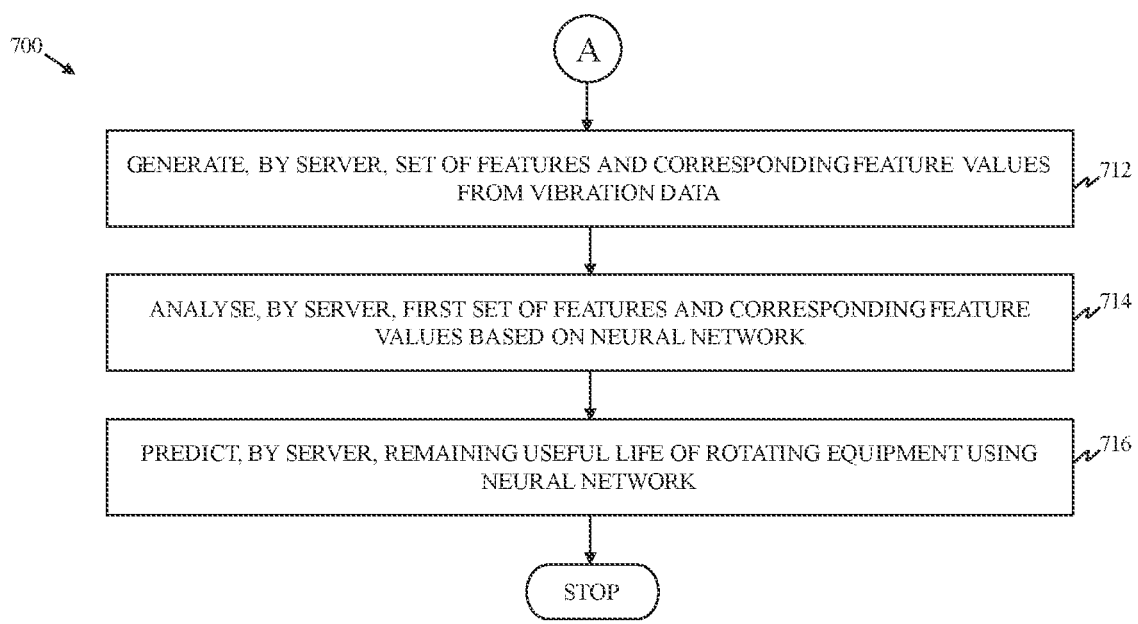

FIGS. 7A and 7B are high level flowcharts that collectively illustrate the method for monitoring the first rotating equipment, in accordance with an exemplary embodiment of the disclosure.

Referring to FIG. 700, at 702, the vibration data, the acoustic emission data, the temperature data, and the magnetic flux data from the plurality of sensors is received. The microcontroller 312 is configured to receive the vibration data, the acoustic emission data, the temperature data, and the magnetic flux data from the plurality of sensors.

At 704, the anomaly associated with the first rotating equipment 102a is determined based on the acoustic emission data and the temperature data. The microcontroller 312 is configured to determine the anomaly associated with the first rotating equipment 102a based on the acoustic emission data and the temperature data.

At 706, the vibration data and the magnetic flux data are received by the application server 106. The application server 106 is configured to receive the vibration data and the magnetic flux data.

At 708, the RPM data associated with the first rotating equipment 102a is determined based on the magnetic flux data. The application server 106 is configured to determine the RPM data associated with the first rotating equipment 102a based on the magnetic flux data.

At 710, the one or more faults are diagnosed based on received vibration data and the determined RPM data. The application server 106 is configured to diagnose the one or more faults based on the received vibration data and the determined RPM data.

At 712, the set of features and corresponding feature values are generated from the vibration data. The application server 106 is configured to generate the set of features and corresponding feature values from the vibration data.

At 714, the set of features and corresponding feature values are analyzed based on the neural network. The application server 106 is configured to analyze the set of features and corresponding feature values.

At 716, the RUL of the first rotating equipment 102*a* is predicted using a neural network. The application server 106 is configured to predict the RUL of the first rotating equipment 102*a* using the neural network. The application server 106 is configured to predict the RUL based on the analysis of the set of features and corresponding feature values.

Various embodiments of the disclosure provide the application server 106 and the microcontroller 312 for monitoring the first rotating equipment 102*a*. The microcontroller 312 may be configured to receive the vibration data, the acoustic emission data, the temperature data, and the magnetic flux data from the plurality of sensors. The microcontroller 312 is further configured to determine the anomaly associated with the first rotating equipment 102*a* by processing the acoustic emission data and the temperature data. The application server 106 is configured to receive, from the sensor device 200 over the communication network 108, the vibration data and the magnetic flux data. In an embodiment, the application server 106 is configured to receive, from the sensor device 200 over the communication network 108, the acoustic emission data, the temperature data, the vibration data, and the magnetic flux data. The application server 106 is configured to determine revolutions per minute (RPM) data associated with the first rotating equipment 102*a* based on the magnetic flux data. The application server 106 is further configured to diagnose one or more faults of the first rotating equipment 102*a* by processing the received vibration data and determined RPM data. The application server 106 is further configured to generate the set of features and corresponding feature values from the vibration data. The application server 106 is further configured to analyse the set of features and corresponding feature values based on the neural network. The application server 106 is further configured to predict the remaining useful life for the first rotating equipment 102*a* by using the neural network.

Various embodiments of the disclosure provide a non-transitory computer-readable medium having stored thereon, computer-executable instructions, which when executed by a computer, cause the computer to execute one or more operations for monitoring the first rotating equipment 102*a*. The one or more operations include receiving, by the microcontroller 312, the temperature data, the vibration data, the acoustic emission data, and the magnetic flux data associated with the first rotating equipment 102*a*. The one or more operations further include pre-processing, by the microcontroller 312, the acoustic emission data, and the temperature data to determine the anomaly associated with the first rotating equipment 102*a*. The one or more operations further include receiving, by the application server 106 in communication with the sensor device 200 via the communication network 108, the vibration data, and the magnetic flux data from the sensor device 200. In an embodiment, the one or more operations further include receiving, by the application server 106 in communication with the sensor device 200 via the communication network 108, the acoustic emission data, the temperature data, the vibration data, and the magnetic flux data. The one or more operations further include determining, by the application server 106, revolutions per minute (RPM) data associated with the first rotating equipment 102*a* based on the magnetic flux data. The one or more operations further include processing, by the application server 106, the received vibration data and determined RPM data to diagnose the one or more faults. The one or more operations further include generating, by the application server 106, the set of features and corresponding feature values based on the vibration data. The one or more operations further include analysing, by the application server 106, the set of features and corresponding feature values based on the neural network. The one or more operations further include predicting, by the application server 106, the remaining useful life for the first rotating equipment 102*a*, by using the neural network.

The disclosed embodiments encompass numerous advantages. Exemplary advantages of the disclosed methods include, but are not limited to, optimal and uninterrupted monitoring of the first rotating equipment 102*a*. The disclosed system allows all-round monitoring of the first rotating equipment 102*a* using only one device (i.e., the sensor device 200). Therefore, the disclosed system significantly simplifies a process of monitoring the first rotating equipment 102*a*. Further, the disclosed system also allows monitoring the first rotating equipment 102*a* using minimal resources and cost. Moreover, the disclosed system and method allows an accurate diagnosis of one or more faults associated with the first rotating equipment 102*a* based on real-time data. Therefore, the diagnosis of the one or more faults associated with the first rotating equipment 102*a* occurs in real-time. Hence, the disclosed system and method aids in significant reduction in occurrence of accidents and related losses. The disclosed system and method also allow the prediction of the RUL associated with the first rotating equipment 102*a*. The diagnosis of the one or more faults and the RUL is indicative of the real-time health of the first rotating equipment 102*a*. Therefore, a maintenance and/or replacement of the first rotating equipment 102*a* may be planned and a sudden and unexpected break down of the first rotating equipment 102*a* may be avoided. Moreover, the disclosed systems and methods allows real-time notification regarding the anomaly, one or more faults, and/or the RUL of the first rotating equipment. Hence, the disclosed systems and methods ensure that the health of the first rotating equipment 102*a* does not get ignored in any scenario. The disclosed systems and methods have applications in various fields that rotating equipment such as oil and gas refinery industry, mining industries, utility industries, heating, ventilation, and air conditioning (HVAC) manufacturing industries, and the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In some embodiments, the order of operations may be rearranged without departing from the spirit of the disclosed subject matter.

Techniques consistent with the disclosure provide, among other features, systems and methods for monitoring rotating equipment. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A system for monitoring a rotating equipment, the system comprising:
    a sensor device configured to acquire vibration data, acoustic emission data, temperature data, humidity data, and magnetic flux data associated with the rotating equipment, wherein the sensor device comprises:
        a base;
        a holding frame attached to the base;
        a first integrated circuit, including a plurality of sensors and a microcontroller connected to the plurality of sensors, wherein
            the first integrated circuit is attached to the holding frame,
            the plurality of sensors comprise an acoustic sensor configured to collect the acoustic emission data associated with the rotating equipment, a vibration sensor configured to collect the vibration data associated with the rotating equipment, a temperature sensor configured to collect the temperature data associated with a surface of the rotating equipment, a humidity sensor configured to collect the humidity data associated with an environment near the rotating equipment, and a magnetic flux sensor configured to collect the magnetic flux data associated with the rotating equipment, and
            the microcontroller is configured to:
                receive the vibration data, the acoustic emission data, the temperature data, the humidity data, and the magnetic flux data from the plurality of sensors;
                determine a plurality of values of the acoustic emission data corresponding to a plurality of temperature points present in the temperature data; and
                detect an anomaly associated with the rotating equipment based on a value of the plurality of values corresponding to a temperature point of the plurality of temperature points being greater than or equal to a threshold value, and wherein the threshold value is determined based on a trend of change in the determined plurality of values corresponding to the plurality of temperature points;
    a power source, having an energy harvester and a battery, wherein
        the power source is attached to the holding frame,
        the power source is connected to the first integrated circuit to power the plurality of sensors and the microcontroller, and
        the energy harvester is configured to recharge the battery; and
    a housing attached to the base to enclose the holding frame, the first integrated circuit, and the power source; and
    an application server, in communication with the sensor device via a communication network, wherein the application server is configured to:
        receive, from the sensor device over the communication network, the vibration data and the magnetic flux data;
        determine revolutions per minute (RPM) data associated with the rotating equipment based on the magnetic flux data;
        diagnose one or more faults of the rotating equipment based on the vibration data and the RPM data;
        generate a set of features and corresponding feature values from the vibration data;
        analyse the set of features and corresponding feature values based on a neural network; and
        predict a remaining useful life of the rotating equipment using the neural network.

2. The system of claim 1, wherein
    the sensor device further comprises a second integrated circuit, including a SIM card holder to receive a SIM card,
    the second integrated circuit is attached to the holding frame, and
    the second integrated circuit is connected to the first integrated circuit.

3. The system of claim 1, wherein the application server is further configured to communicate a notification to a user device associated with the rotating equipment, and wherein the notification includes one of a visual indication of the one or more faults, an audio indication of the one or more faults, and a textual information regarding the one or more faults.

4. The system of claim 1, wherein the energy harvester is further coupled to a pair of charging channels associated with the vibration sensor, wherein the pair of charging channels is configured to provide the energy harvester an input to harvest electric energy to recharge the battery.

5. The system of claim 4, wherein the energy harvester recharges the battery based on a resonance frequency caused by vibrations detected by the vibration sensor.

6. The system of claim 1, wherein the base comprises an opening to the surface of the rotating equipment.

7. The system of claim 6, wherein the temperature sensor is an infra-red temperature sensor, and wherein the infra-red temperature sensor is positioned with respect to the opening in a way that the infra-red temperature sensor measures a temperature of the surface of the rotating equipment via the opening.

8. A method for monitoring a rotating equipment, the method comprising:
    receiving, by a microcontroller of a first integrated circuit of a sensor device configured to acquire vibration data, acoustic emission data, temperature data, humidity data, and magnetic flux data associated with the rotating equipment, the vibration data, the acoustic emission data, the temperature data, the humidity data, and the magnetic flux data from a plurality of sensors of the first integrated circuit, wherein
        the plurality of sensors comprise an acoustic sensor configured to collect the acoustic emission data associated with the rotating equipment, a vibration sensor configured to collect the vibration data associated with the rotating equipment, a temperature sensor configured to collect the temperature data associated with a surface of the rotating equipment, a humidity sensor configured to collect the humidity data associated with an environment near the rotating equipment, and a magnetic flux sensor configured to collect the magnetic flux data associated with the rotating equipment, the sensor device further comprises a base, a holding frame attached to the base, a power source attached to the holding frame, and a housing attached to the base to enclose the holding frame, the first integrated circuit, and the power source, the power source comprises an energy harvester and a battery, wherein the power source is connected to the first integrated circuit to power the plurality of sensors and the microcontroller, and the energy harvester is configured to recharge the battery;

determining, by the microcontroller, a plurality of values of the acoustic emission data corresponding to a plurality of temperature points present in the temperature data;

detecting, by the microcontroller, an anomaly associated with the rotating equipment based on a value of the plurality of values corresponding to a temperature point of the plurality of temperature points being greater than or equal to a threshold value, and wherein the threshold value is determined based on a trend of change in the determined plurality of values corresponding to the plurality of temperature points;

receiving, by an application server in communication with the sensor device via a communication network, the vibration data and the magnetic flux data from the sensor device;

determining, by the application server, revolutions per minute (RPM) data associated with the rotating equipment based on the magnetic flux data;

diagnosing, by the application server, one or more faults of the rotating equipment based on the vibration data and the RPM data;

generating, by the application server, a set of features and corresponding feature values from the vibration data;

analysing, by the application server, the set of features and corresponding feature values based on a neural network; and predicting, by the application server, a remaining useful life for the rotating equipment, by using the neural network.

9. The method of claim 8, wherein the sensor device further comprises
a second integrated circuit, including a SIM card holder to receive a SIM card,
the second integrated circuit is attached to the holding frame, and
the second integrated circuit is connected to the first integrated circuit.

10. The method of claim 8 further comprising communicating, by the application server, a notification to a user device associated with the rotating equipment, wherein the notification includes one of a visual indication of the one or more faults, an audio indication of the one or more faults, and a textual information regarding the one or more faults.

11. The method of claim 8, wherein the energy harvester is further coupled to a pair of charging channels associated with the vibration sensor, and wherein the pair of charging channels is configured to provide the energy harvester with an input for harvesting electric energy to recharge the battery.

12. The method of claim 11, wherein the energy harvester recharges the battery based on a resonance frequency caused by vibrations detected by the vibration sensor.

13. The method of claim 8, wherein the base comprises an opening to the surface of the rotating equipment.

14. The method of claim 13, wherein the temperature sensor is an infra-red temperature sensor, and wherein the infra-red temperature sensor is positioned with respect to the opening in a way that the infra-red temperature sensor measures a temperature of the surface of the rotating equipment via the opening.

15. A non-transitory computer readable medium having stored thereon, computer executable instruction, which when executed by a computer, cause the computer to execute operations, the operations comprising:

receiving, by a microcontroller of a first integrated circuit of a sensor device configured to acquire vibration data, acoustic emission data, temperature data, humidity data, and magnetic flux data associated with the rotating equipment, the vibration data, the acoustic emission data, the temperature data, the humidity data, and the magnetic flux data from a plurality of sensors of the first integrated circuit, wherein the plurality of sensors comprise an acoustic sensor configured to collect the acoustic emission data associated with the rotating equipment, a vibration sensor configured to collect the vibration data associated with the rotating equipment, a temperature sensor configured to collect the temperature data associated with a surface of the rotating equipment, a humidity sensor configured to collect the humidity data associated with environment near the rotating equipment, and a magnetic flux sensor configured to collect the magnetic flux data associated with the rotating equipment, the sensor device further comprises a base, a holding frame attached to the base, a power source attached to the holding frame, and a housing attached to the base to enclose the holding frame, the first integrated circuit, and the power source, the power source comprises an energy harvester and a battery, the power source is connected to the first integrated circuit to power the plurality of sensors and the microcontroller, and the energy harvester is configured to recharge the battery;

determining, by the microcontroller, a plurality of values of the acoustic emission data corresponding to a plurality of temperature points present in the temperature data;

detecting, by the microcontroller, an anomaly associated with the rotating equipment based on a value of the plurality of values corresponding to a temperature point of the plurality of temperature points being greater than or equal to a threshold value, and wherein the threshold value is determined based on a trend of change in the determined plurality of values corresponding to the plurality of temperature points;

receiving, by the application server in communication with the sensor device via a communication network, the vibration data, the humidity data, and the magnetic flux data from the sensor device;

determining, by the application server, revolutions per minute (RPM) data associated with the rotating equipment based on the magnetic flux data;

diagnosing, by the application server, one or more faults of the rotating equipment based on the vibration data and the RPM data;

generating, by the application server, a set of features and corresponding feature values based on the vibration data;

analysing, by the application server, the set of features and corresponding feature values based on a neural network; and predicting, by the application server, a remaining useful life for the rotating equipment, by using the neural network.

16. The system of claim 1, wherein the microcontroller is further configured to determine a plurality of values of the magnetic flux data or the vibration data, corresponding to each temperature point, of the plurality of temperature points, in the temperature data.

* * * * *